United States Patent
Tamura (10) Patent No.: US 9,990,338 B2
(45) Date of Patent: Jun. 5, 2018

(54) DISPLAY DEVICE FOR CONTROLLING ENLARGEMENT OF DISPLAYED IMAGE DATA, AND DATA PROCESSING DEVICE AND NON-TRANSITORY COMPUTER READABLE MEDIUM

(71) Applicant: CASIO COMPUTER CO., LTD., Shibuya-ku, Tokyo (JP)

(72) Inventor: Koji Tamura, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 249 days.

(21) Appl. No.: 14/543,360

(22) Filed: Nov. 17, 2014

(65) Prior Publication Data
US 2015/0178888 A1    Jun. 25, 2015

(30) Foreign Application Priority Data
Dec. 19, 2013    (JP) .................................. 2013-262046

(51) Int. Cl.
*G06F 17/21*    (2006.01)
*G06T 11/60*    (2006.01)

(52) U.S. Cl.
CPC ............ *G06F 17/217* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 7,127,673 B2 * | 10/2006 | Iwata | G06F 17/211 715/209 |
| 7,385,615 B2 * | 6/2008 | Vale | G09G 5/005 345/441 |
| 7,973,824 B2 | 7/2011 | Kawahara | |
| 8,379,103 B2 | 2/2013 | Kawahara | |
| 8,873,886 B2 | 10/2014 | Fukazawa | |
| 9,189,148 B2 | 11/2015 | Yoshinaka | |
| 9,483,857 B2 | 11/2016 | Yoshinaka | |

(Continued)

FOREIGN PATENT DOCUMENTS

| | | |
|---|---|---|
| CN | 101163207 A | 4/2008 |
| CN | 102981732 A | 3/2013 |

(Continued)

OTHER PUBLICATIONS

StackOverflow ("Scale with CGAffineTransform and set the anchor", 2012, https://stackoverflow.com/questions/8757613/scale-with-cgaffinetransform-and-set-the-anchor).*

(Continued)

*Primary Examiner* — Xin Sheng
(74) *Attorney, Agent, or Firm* — Holtz, Holtz & Volek PC (57) ABSTRACT

A display device, including: a storage unit in which page image data including a figure or a photograph and figure photo information are stored so as to be associated with each other for each page, the figure photo information corresponding to a figure or a photograph included in a page, being information for individually displaying the figure or the photograph and including area information which indicates an area occupied by the figure or the photograph in page image data corresponding to the page; a display unit; an operation unit; an identification unit; and a display control unit.

11 Claims, 10 Drawing Sheets

(56) References Cited

U.S. PATENT DOCUMENTS

| | | | |
|---|---|---|---|
| 9,508,170 | B2 | 11/2016 | Kashibuchi et al. |
| 2002/0002570 | A1* | 1/2002 | Sakai ................... G06T 3/40 |
| | | | 715/210 |
| 2006/0082599 | A1 | 4/2006 | Kameyama |
| 2007/0030293 | A1* | 2/2007 | Shimizu ............... G06F 3/0481 |
| | | | 345/668 |
| 2008/0218595 | A1 | 9/2008 | Kawahara |
| 2011/0228125 | A1 | 9/2011 | Kawahara |
| 2012/0306928 | A1 | 12/2012 | Yoshinaka |
| 2013/0064473 | A1 | 3/2013 | Fukazawa |
| 2013/0232407 | A1 | 9/2013 | Onuma et al. |
| 2014/0092141 | A1* | 4/2014 | Takagi ................... G06T 3/40 |
| | | | 345/660 |
| 2016/0035118 | A1 | 2/2016 | Yoshinaka |

FOREIGN PATENT DOCUMENTS

| | | |
|---|---|---|
| CN | 102999261 A | 3/2013 |
| JP | 2006119229 A | 5/2006 |
| JP | 2012113543 A | 6/2012 |
| JP | 2013190870 A | 9/2013 |
| WO | 2008139551 A1 | 11/2008 |

OTHER PUBLICATIONS

Birla ("How to build a scalable, caching, resizing image server", 2011, http://sumitbirla.com/2011/11/how-to-build-a-scalable-caching-resizing-image-server/)*

Chinese Office Action (and English translation thereof) dated May 4, 2017 issued in counterpart Chinese Application No. 201410799072.7.

Japanese Office Action dated Dec 19, 2017 issued in Japanese Application No. 2013-262046.

Japanese Office Action (and English translation thereof) dated Sep. 5, 2017 issued in counterpart Japanese Applicaiton No. 2013-262046.

Chinese Office Action dated Dec. 12, 2017 issued in counterpart Chinese Application No. 201410799072.7.

* cited by examiner

DISPLAY DEVICE FOR CONTROLLING ENLARGEMENT OF DISPLAYED IMAGE DATA, AND DATA PROCESSING DEVICE AND NON-TRANSITORY COMPUTER READABLE MEDIUM

BACKGROUND OF THE INVENTION

1. Field of the Invention

The present invention relates to a display device, a data processing device and a computer readable medium.

2. Description of Related Art

In recent years, when performing presentation, there is used a method for creating document data for presentation by using application software such as Power Point (registered trademark) on a PC (Personal Computer) and displaying slides of the document data per page.

When performing presentation, apart to be focused in an image is enlarged to be displayed in many cases. As a technique for enlarging a part of display information, for example, there is suggested a display information enlarging method for a mobile terminal that is preparing character strings in a standard size and character strings in an enlarged size, converting a character string which is selected among the displayed character strings in the standard size into a character string in the enlarged size corresponding to the character string, and displaying the converted character string (see Japanese Patent Application Laid Open Publication No. 2006-119229).

When presentation is performed by using a tablet terminal which is not equipped with the application software that created document data, the presentation is performed by converting the document data into an image file in a JPEG (Joint Photographic Experts Group) format for each page in the PC, and thereafter transmitting the JPEG file for each page to the tablet terminal to display the image of each page on the tablet terminal. In the tablet terminal, display of an image of next page or previous page and enlargement or reduction of the image is instructed by user's operation.

Figure 13:
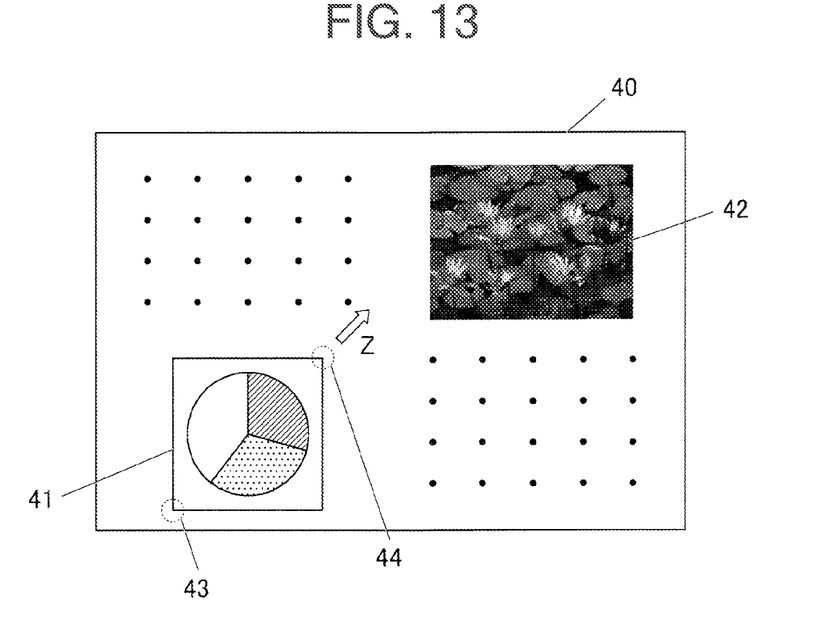
FIG. 13 is a view for explaining an enlargement method by a conventional pinch operation.

Here, a general operation in a case where an image is displayed on a tablet terminal will be described with reference to FIG. 13. An image 40 for one page displayed on the tablet terminal includes a figure (circle graph) 41 and a photograph 42. When the FIG. 41 is enlarged to be displayed, an operation (pinch operation) is performed, the operation being touching the lower left 43 and the upper right 44 of the FIG. 41 with fingers at the same time and directly increasing the space between the fingers until the FIG. 41 is displayed in a desired size. In the example of FIG. 13, by moving the finger touching the upper right 44 of the FIG. 41 in the arrow Z direction, the FIG. 41 is enlarged in accordance with the movement of the finger.

However, when instructing the enlargement by the pinch operation on a screen of the tablet terminal, there has been a problem that the screen flickers and is difficult to be seen since the JPEG image is enlarged and redrawing is performed for the entire screen every time the movement of finger is detected.

In addition, when the user is not accustomed to the operation, the enlargement operation is performed in several steps, the image is excessively enlarged to need a reduction operation in reverse, or such like, and thus, the pinch operation needs to be performed a plurality of times, leading to bad operability.

Furthermore, since the user performs an operation by moving a hand above the screen in the tablet terminal, the hand covers the screen during the operation, which is visually undesirable.

SUMMARY OF THE INVENTION

An object of the present invention is to improve operability when enlarging a figure or a photograph included in an image.

In order to solve the above object, a display device according to the present invention includes: a storage unit in which page image data including a figure or a photograph and figure photo information are stored so as to be associated with each other for each page, the figure photo information corresponding to a figure or a photograph included in a page, being information for individually displaying the figure or the photograph and including area information which indicates an area occupied by the figure or the photograph in page image data corresponding to the page; a display unit on which a page image is displayed on the basis of the page image data stored in the storage unit; an operation unit which receives specification of a position on the page image displayed on the display unit; an identification unit which determines whether the position specified via the operation unit is within the area of the figure or the photograph included in the displayed page on the basis of the area information included in the figure photo information of the displayed page, and identifies the figure or the photograph corresponding to the area if the position specified via the operation unit is determined to be within the area of the figure or the photograph included in the displayed page; and a display control unit which enlarges the identified figure or the photograph to be displayed on the display unit on the basis of the figure photo information corresponding to the figure or the photograph identified by the identification unit.

A data processing device according to the present invention includes: a conversion unit which converts document data including a figure or a photograph into page image data per page; a generation unit which generates, for each page, figure photo information for individually displaying a figure or a photograph included in a page, the figure photo information including area information which indicates an area occupied by the figure or the photograph in page image data corresponding to the page; and a storage control unit which stores, for each page, the page image data and the figure photo information corresponding to the figure or the photograph included in the page in the storage unit so as to be associated with each other.

A computer readable medium according to the present invention is a non-transitory computer readable medium which stores a program for making a computer execute a following procedure, the procedure including: displaying a page image on a display unit on the basis of page image data stored in a storage unit in which the page image data including a figure or a photograph and figure photo information are stored so as to be associated with each other for each page, the figure photo information corresponding to a figure or a photograph included in a page, being information for individually displaying the figure or the photograph and including area information which indicates an area occupied by the figure or the photograph in page image data corresponding to the page; obtaining a position specified via an operation unit on the displayed page image; determining whether the position specified via the operation unit is within the area of the figure or the photograph included in the displayed page on the basis of the area information included in the figure photo information of the displayed page, and identifying the figure or the photograph corresponding to the area when determining that the position specified via the operation unit is within the area of the figure or the photograph included in the displayed page; and enlarging the identified figure or the photograph to be displayed on the display unit on the basis of the figure photo information corresponding to the identified figure or the photograph.

A computer readable medium according to the present invention is a non-transitory computer readable medium which stores a program for making a computer execute a following procedure, the procedure including: converting document data including a figure or a photograph into page image data per page; generating, for each page, figure photo information for individually displaying a figure or a photograph included in a page, the figure photo information including area information which indicates an area occupied by the figure or the photograph in page image data corresponding to the page; and storing the page image data and the figure photo information corresponding to the figure or the photograph included in the page in a storage unit so as to be associated with each other for each page.

According to the present invention, operability when enlarging a figure or a photograph included in an image can be improved.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein.

DETAILED DESCRIPTION OF THE PREFERRED EMBODIMENT

Hereinafter, an embodiment of a display device and a data processing device according to the present invention will be described with reference to the drawings. The present invention is not limited to the illustrated example.

Figure 1:
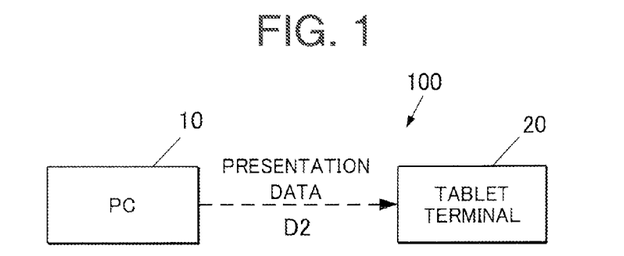
FIG. 1 is a view showing a configuration of a presentation system.

FIG. 1 shows a configuration of a presentation system 100. The presentation system 100 is configured by including a PC 10 as the data processing device and a tablet terminal 20 as the display device. In the presentation system 100, a presentation material is displayed on the tablet terminal 20 on the basis of presentation data D2 created in the PC 10.

Figure 2:
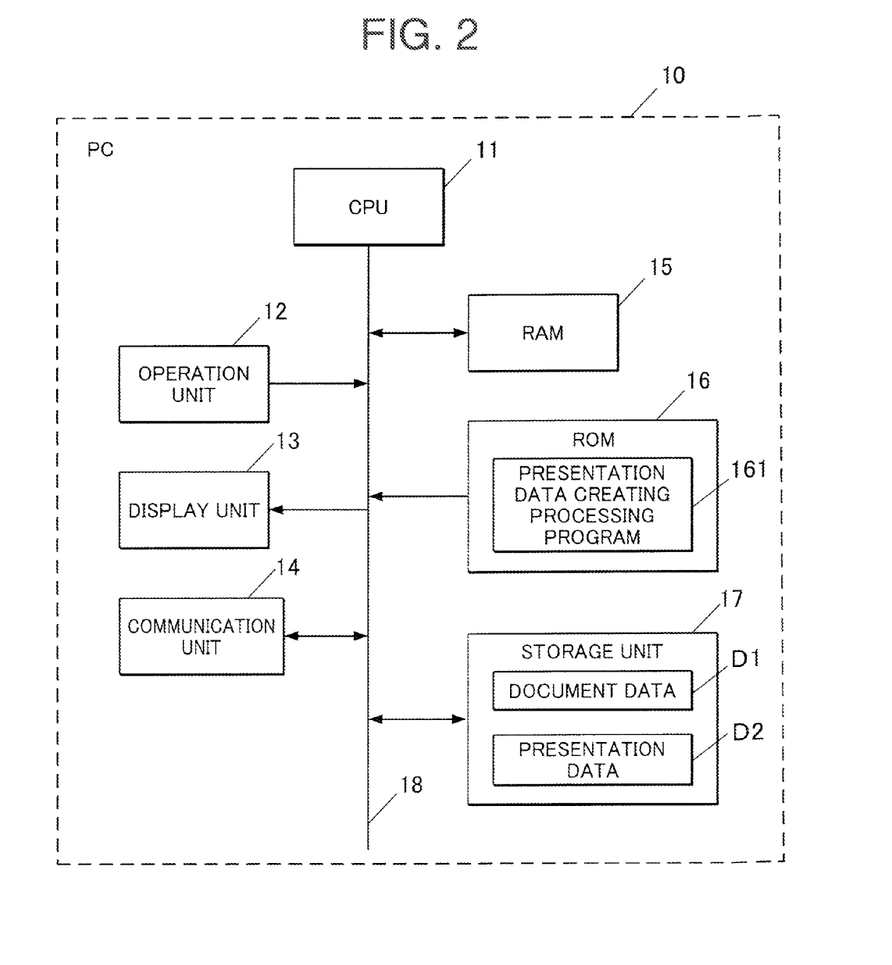
FIG. 2 is a block diagram showing a functional configuration of a PC.

FIG. 2 shows a functional configuration of the PC 10.

The PC 10 includes a CPU (Central Processing Unit) 11 as a conversion unit, a generation unit, a storage control unit and a second conversion unit, an operation unit 12, a display unit 13, a communication unit 14, a RAM (Random Access Memory) 15, a ROM (Read Only Memory) 16 and a storage unit 17. The units are connected to each other via a bus 18.

The CPU 11 integrally controls processing operations of the units in the PC 10. Specifically, the CPU 11 reads out various processing programs stored in the ROM 16 and loads the programs into the RAM 15 to perform various types of processing in cooperation with the respective programs.

The CPU 11 converts document data D1 including a figure or a photograph into page image data per page, and generates a page image file. In the embodiment, JPEG is used as the file format of the page image data.

The document data D1 is electronic data of presentation material formed of a plurality of pages and created by application software such as Power Point for displaying characters and diagrams in a slide format. The document data D1 includes character data, figure data and photograph data. The document data D1 may be electronic data created by Word (registered trademark), Excel (registered trademark) and such like.

The CPU 11 converts a photograph included in a page into photo image data to generate a photo image file for each page. In the embodiment, JPEG is used as a file format of photo image data.

The CPU 11 generates, for each page, figure photo information for individually displaying a figure or a photograph included in a page. The figure photo information includes area information which indicates an area occupied by the figure or the photograph in page image data corresponding to a page including the figure or the photograph. Specifically, as the area information, the upper left coordinates and the lower right coordinates of a rectangular area which is occupied by the figure or the photograph in the page image data are used.

The CPU 11 generates, for each page, figure photo information including photo image data corresponding to a photograph included in a page and corresponding to the photograph. Specifically, figure photo information according to a photograph includes information (file name) indicating photo image data corresponding to the photograph.

The CPU 11 stores page image data and figure photo information corresponding to a figure or a photograph included in a page in the storage unit 17 for each page so as to be associated with each other.

The operation unit 12 is configured by including a keyboard which includes character input keys, number input keys, various function keys and such like and a pointing device such as a mouse. The operation unit 12 outputs an operation signal, which was input by user's key operation to the keyboard or mouse operation, to the CPU 11.

The display unit 13 is configured by including an LCD (Liquid Crystal Display) and such like, and performs screen display in accordance with a display control signal from the CPU 11.

The communication unit 14 is configured by including a network interface and such like, and transmits and receives data to and from an external device connected thereto via a communication network. The communication unit 14 transmits and receives data to and from the tablet terminal 20 connected thereto via a USB (Universal Serial Bus) cable.

The RAM 15 is a volatile memory. In the RAM 15, various programs to be executed, data according to the various programs and such like are stored.

The ROM 16 is a read-only semiconductor memory for storing the various programs and various types of data. In the ROM 16, a presentation data creating processing program 161 is stored.

Figure 3:
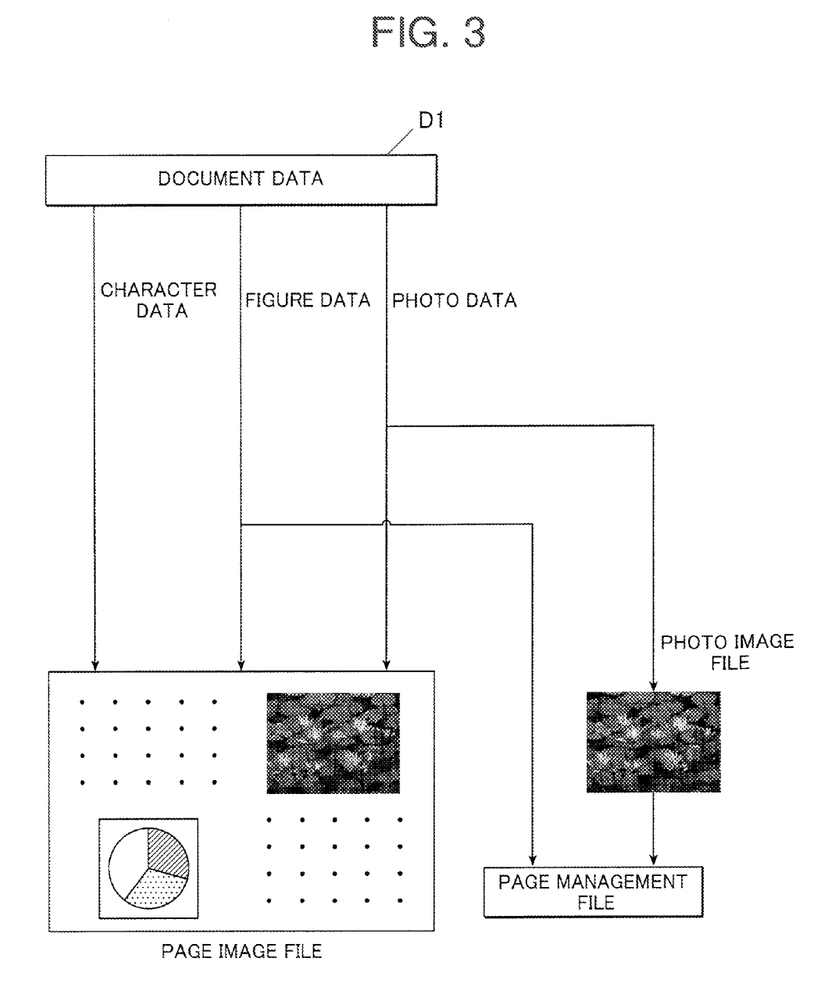
FIG. 3 is a view for explaining a summary of presentation data creating processing.

The presentation data creating processing program 161 is a program for making the CPU 11 execute presentation data creating processing. In the presentation data creating processing, as shown in FIG. 3, a page image file (JPEG file) is generated for each page of the document data D1. In addition to the page image file, a photo image file (JPEG file) is generated for each photograph included in the page. A page management file for managing a figure or a photograph included in the page is also generated.

The storage unit 17 is configured by including an HDD (Hard Disk Drive), a non-volatile memory and such like, and stores information so as to be readable and writable. For example, the document data D1 and the presentation data D2 are stored in the storage unit 17.

The presentation data D2 is data created by the presentation data creating processing and transmitted to the tablet terminal 20.

Figure 4:
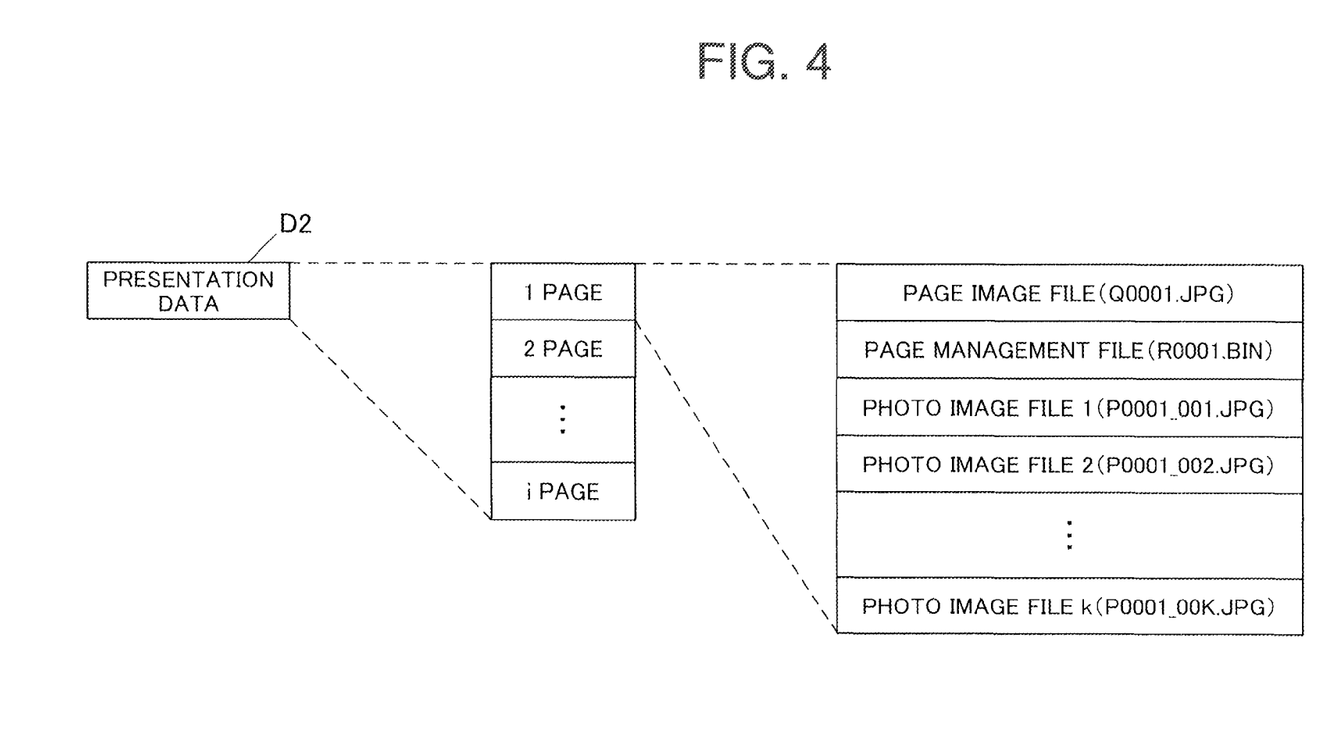
FIG. 4 is a view showing a configuration of presentation data created by the PC.

FIG. 4 shows a configuration (file system) of the presentation data D2.

In the presentation data D2, a page image file, a page management file and several photo image files of photographs included in a page are associated with each other for each page.

The page image file is a file obtained by converting each page of the document data D1 into a single JPEG file.

The page management file is a file for managing a figure or a photograph in the page.

The photo image file is a file obtained by converting a single photograph into a single JPEG file for each photograph included in the page.

In a case where the document data D1 is formed of a plurality of pages, the presentation data D2 includes sets of page image file, page management file and one or a plurality of photo image files for the number of the pages.

Figure 5:
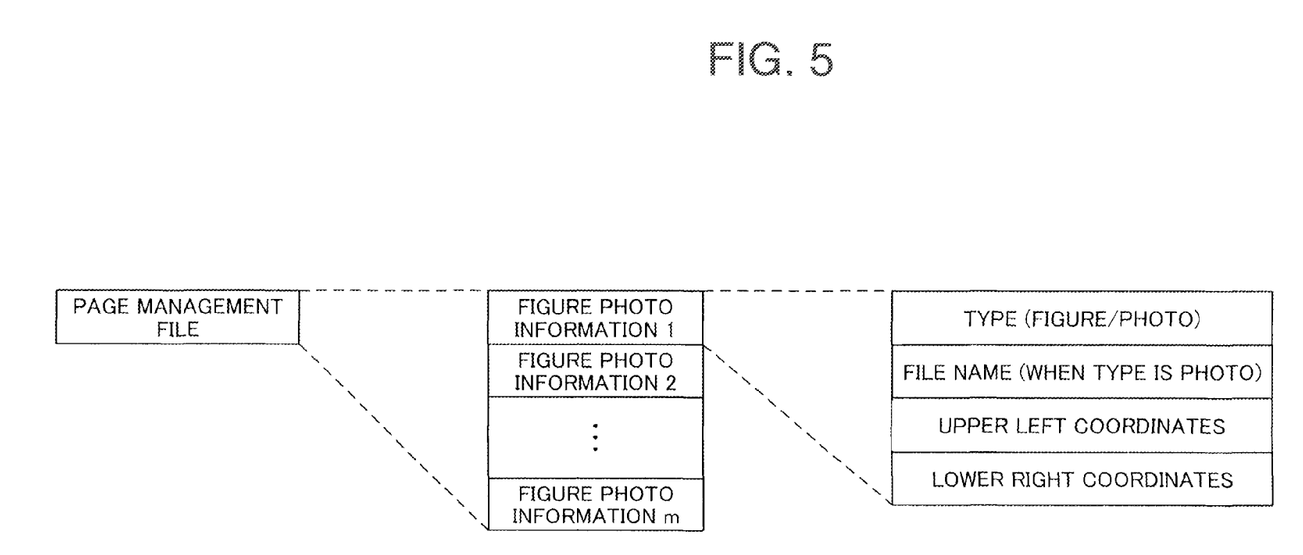
FIG. 5 is a view showing a configuration of a page management file.

FIG. 5 shows a configuration of page management file.

The page management file is formed of figure photo information corresponding to a figure or a photograph included in a page.

The figure photo information includes the type, file name and upper left and lower right coordinates.

The type is information indicating whether the record (figure photo information) is information regarding a figure or information regarding a photograph.

The file name is information indicating a file name of photo image file corresponding to the photograph in a case where the type of the record is photograph. The information is not used in a case where the type of the record is figure.

The upper left coordinates are the upper left coordinates of the rectangular area which is occupied by the figure or photograph in the page image data.

The lower right coordinates are the lower right coordinates of the rectangular area which is occupied by the figure or photograph in the page image data.

The enlargement method may be further included in the figure photo information. The enlargement method includes a reference position which is a reference when enlarging a figure or photograph and enlargement ratio when enlarging figure or photograph, for example. The reference position is a position which does not move between before and after the enlargement processing and is specified by coordinates in the page image data. The enlargement method may be selected from among a plurality of predetermined enlargement methods depending on the location of the figure or photograph in the page including the figure or photograph, and the user may be able to specify the enlargement method with respect to the figure or photograph.

As shown in FIGS. 4 and 5, in the presentation data D2, since a page image file and a page management file are associated with each other for each page, the page image file and figure photo information corresponding to a figure or a photograph included in the page are associated with each other. In a case where a photograph is included in the page, the figure photo information corresponding to the photograph includes information indicating a file name of the photo image file, and thereby, the photo image file and the page image file are associated with each other.

Figure 6:
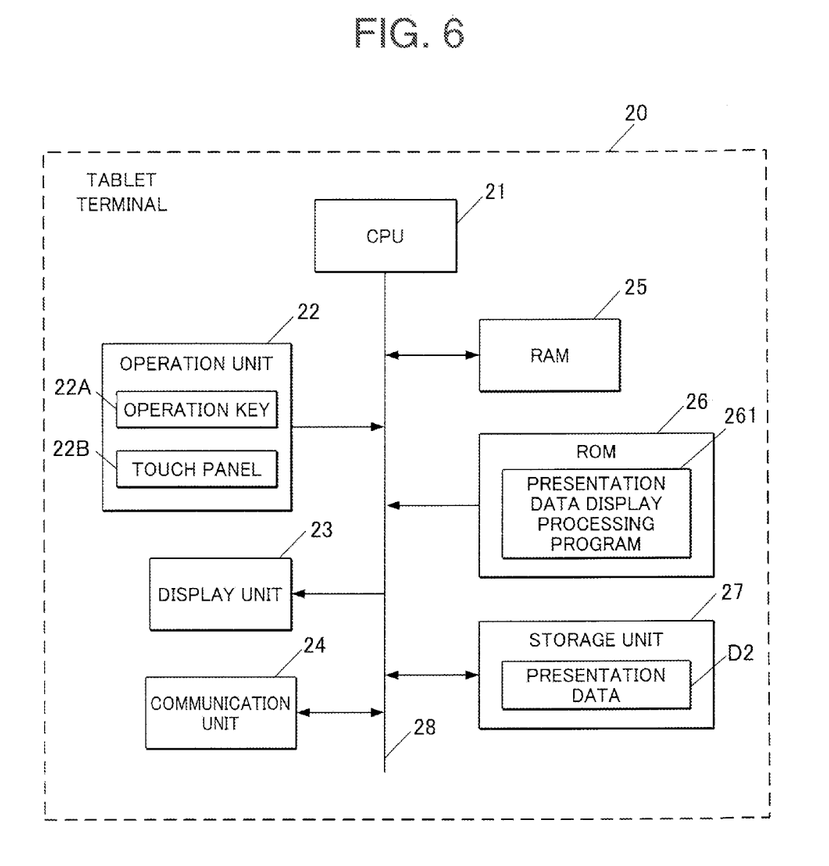
FIG. 6 is a block diagram showing a functional configuration of a tablet terminal.

FIG. 6 shows a functional configuration of the tablet terminal 20.

The tablet terminal 20 includes a CPU 21 as an identification unit and a display control unit, an operation unit 22, a display unit 23, a communication unit 24, a RAM 25, a ROM 26 and a storage unit 27, and the units are connected to each other via a bus 28.

The CPU 21 integrally controls processing operations of the units in the tablet terminal 20. Specifically, the CPU 21 reads out the various processing programs stored in the ROM 26 and loads them into the RAM 25, performs various types of processing in cooperation with the programs.

The CPU 21 displays a page image on the display unit 23 on the basis of any page image data included in the presentation data D2 which was transmitted from the PC 10 and stored in the storage unit 27.

The CPU 21 determines whether the position specified via the operation unit 22 is within the area of the figure or photograph included in the displayed page on the basis of area information included in the figure photo information of the displayed page. If it is determined that the position specified via the operation unit 22 is within the area of the figure or photograph included in the displayed page, the CPU 21 identifies the figure or photograph corresponding to the area.

The CPU 21 enlarges the identified figure or photograph and displays it on the display unit 23 on the basis of the figure photo information corresponding to the identified figure or photograph.

If the position specified via the operation unit 22 is within the area of a figure included in the displayed page, on the basis of area information (upper left and lower right coordinates) included in the figure photo information corresponding to the figure, the CPU 21 reads out a rectangular area corresponding to the figure from page image data corresponding to the displayed page, enlarges the read area and displays the enlarged figure on the display unit 23.

If the position specified by the operation unit 22 is within the area of a photograph included in the displayed page, the CPU 21 reads out photo image data indicating the file name on the basis of the file name included in the figure photo information corresponding to the photograph. Then, the CPU 21 enlarges the identified photograph and displays it on the display unit 23 on the basis of the photo image data corresponding to the identified photograph.

If the figure photo information includes a reference position and an enlargement ratio, the CPU 21 enlarges a figure or photograph according to the enlargement ratio around the reference position.

If the figure photo information does not include a reference position and an enlargement ratio, the CPU 21 may enlarge the figure or photograph by a predetermined reference position and enlargement ratio, or may enlarge the figure or photograph by a reference position and enlargement ratio so that the enlarged figure or photograph is not out of the display screen of the display unit 23. For example, the identified figure or photograph may be enlarged to the entire display screen.

The operation unit 22 is configured by including operation keys 22A such as a power key to turn on and off the power source and a touch panel 22B layered on the display unit 23. The operation unit 22 outputs an operation signal corresponding to each of the operation keys 22A and an operation signal corresponding to the position of touch operation by a user's finger or the like to the CPU 21. For example, the touch panel 22B receives specification of a position of figure or photograph which is to be a target of enlargement on the page image displayed on the display unit 23.

The display unit 23 is configured by including an LCD or the like, and performs screen display in accordance with a display control signal from the CPU 21.

The communication unit 24 is configured by including a network interface or the like, and transmits and receives data to and from an external device connected thereto via a communication network. The communication unit 24 transmits and receives data to and from the PC 10 connected thereto via a USB cable.

The RAM 25 is a volatile memory. In the RAM 25, various programs to be executed and data according to the various programs are stored.

The ROM 26 is a read only semiconductor memory to store the various programs and various types of data. A presentation data display processing program 261 is stored in the ROM 26.

The storage unit 27 is configured by including an HDD, a non-volatile memory and such like, and stores information so as to be readable and writable. For example, presentation data D2 received from the PC 10 is stored in the storage unit 27.

In the presentation data D2, page image data (page image file), figure photo information (page management file) corresponding to a figure or photograph included in a page, and photo image data (photo image file) corresponding to a photograph included in the page are associated with each other for each page (see FIGS. 4 and 5).

Next, operations in the presentation system 100 will be described.

Figure 7:
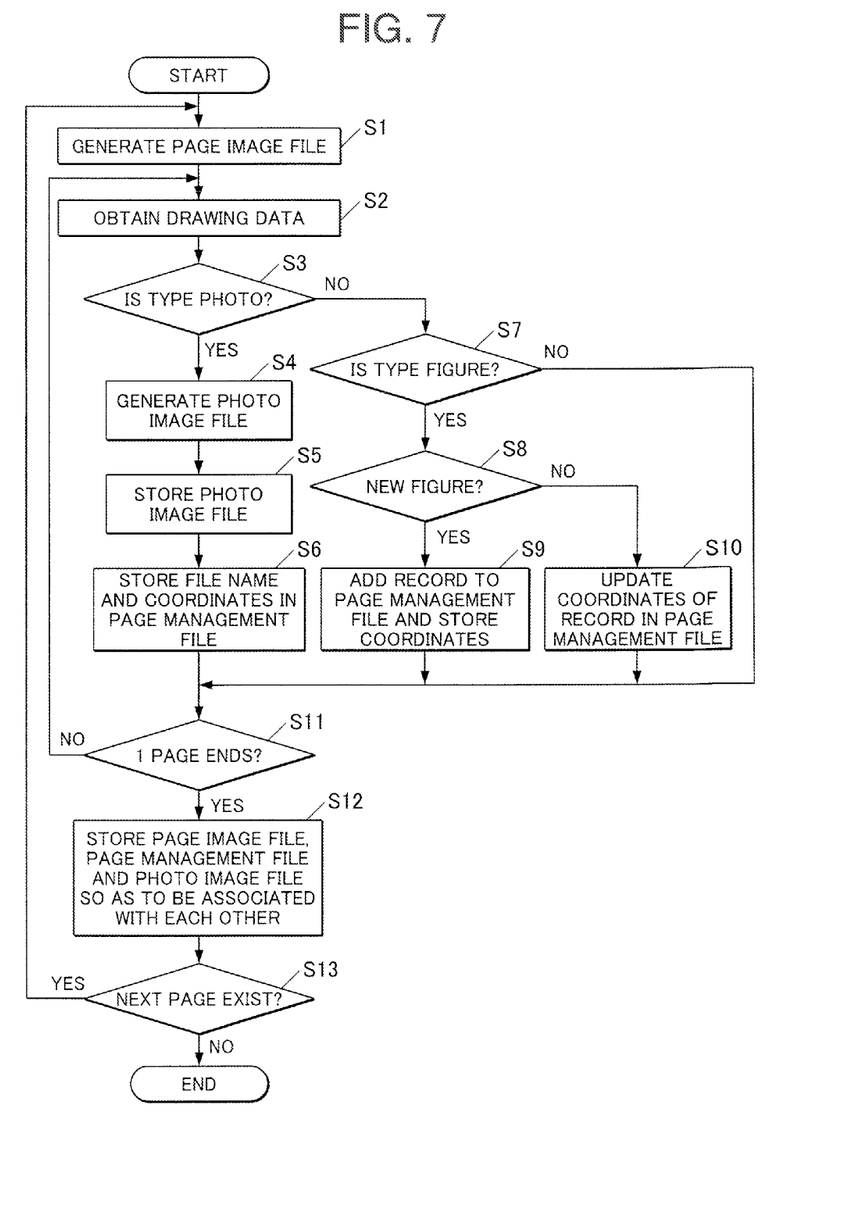
FIG. 7 is a flowchart showing the presentation data creating processing executed by the PC.

FIG. 7 is a flowchart showing presentation data creating processing executed in the PC 10. The processing is for creating presentation data D2 to be used in the tablet terminal 20, and is executed by software processing in cooperation between the CPU 11 and the presentation data creating program 161 stored in the ROM 16.

The CPU 11 first reads out the document data D1 stored in the storage unit 17, converts drawing data for one page included in the document data D1 into page image data to generate a page image file (step S1).

Next, the CPU 11 obtains drawing data included in the page which is a processing target of the document data D1 in order (step S2). The drawing data is any one of character data, figure data and photo data.

The CPU 11 next determines whether the type of obtained drawing data is photograph (step S3). If the type of obtained drawing data is the photograph (step S3; YES), the CPU 11 converts the obtained drawing data (photo data) into JPEG file to generate a photo image file (step S4), and stores the generated photo image file as data for a processing target page in the storage unit 17 (step S5).

The CPU 11 adds a new record (figure photo information) to the page management file for the processing target page, stores "photo" in the "type", stores "name of photo image file" in the "file name", stores "the upper left coordinates of the rectangular area occupied by the photograph in the page image data" in the "upper left coordinates" and stores "lower right coordinates of the rectangular area occupied by the photograph in the page image data" in "lower right coordinates" (step S6).

In step S3, if the type of obtained drawing data is not photograph (step S3; NO), the CPU 11 determines whether the type of obtained drawing data is figure (step S7). If the type of obtained drawing data is figure (step S7; YES), the CPU 11 determines whether the obtained drawing data (figure data) is data regarding a new figure (step S8).

A plurality of parts forming a same figure are sometimes obtained as different drawing data. Thus, the plurality of parts are determined to form a same figure when a difference in coordinates (distance) between the parts corresponding to respective drawing data is a predetermined value or less, or when the parts corresponding to respective drawing data overlap each other.

In step S8, if the obtained drawing data is data regarding a new figure (step S8; YES), that is, if the obtained drawing data does not form the same figure as drawing data which has been processed, the CPU 11 adds a new record (figure photo information) to the page management file for the processing target page, stores "figure" in "type", stores "upper left coordinates of the rectangular area occupied by the figure in the page image data" in "upper left coordinates" and stores "lower right coordinates of rectangular area occupied by the figure in the page image data" in "lower right coordinates" (step S9).

In step S8, if the obtained drawing data is not data regarding a new figure (step S8; NO), that is, if the obtained drawing data forms the same figure as drawing data which has been processed, the CPU 11 updates the coordinates of the record (figure photo information) which is determined to form the same figure in the page management file of the processing target page (step S10).

Figure 8:
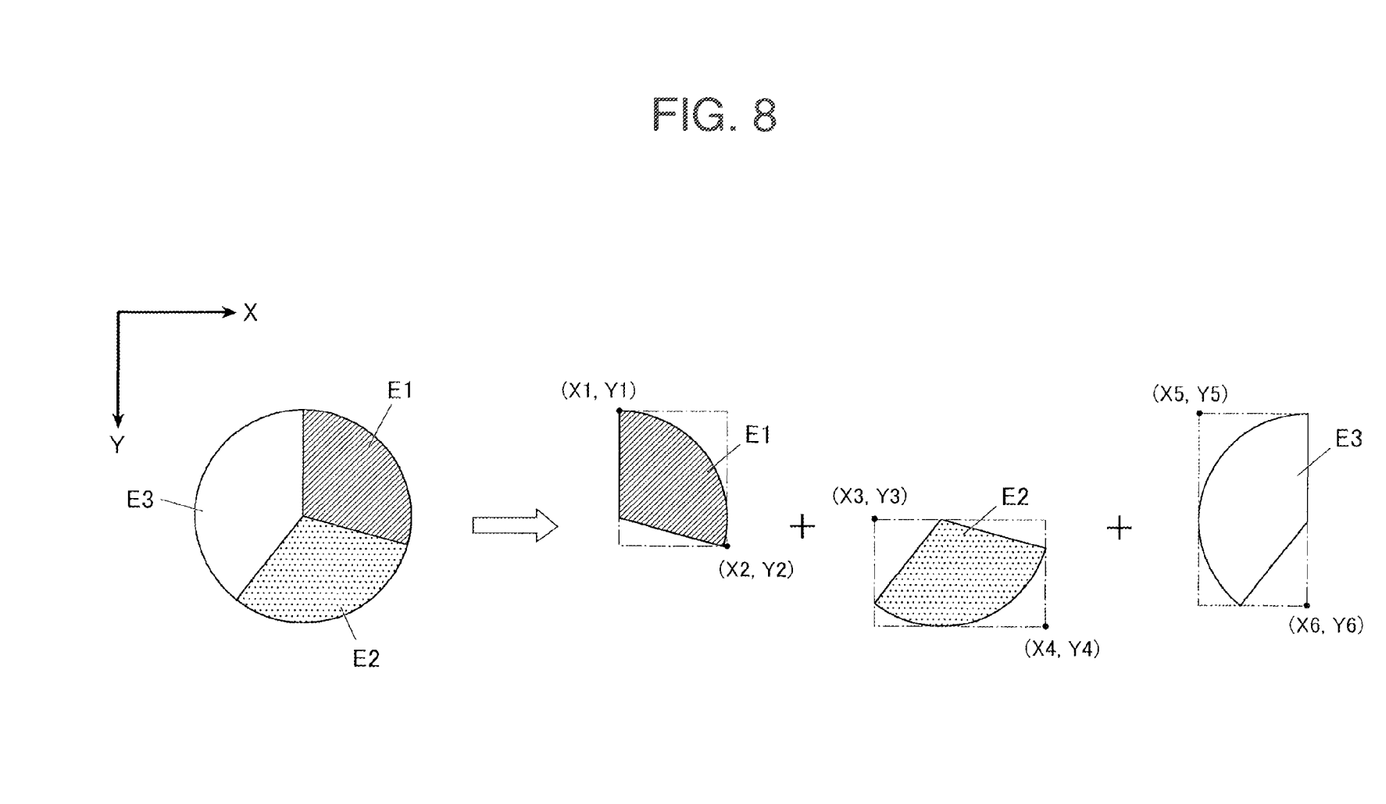
FIG. 8 is an example in which a figure is formed of a plurality of elements.

With reference to FIG. 8, a case where a figure (circle graph) is formed of three elements E1 to E3 will be described as an example.

As shown in FIG. 8, the X-axis and Y-axis are provided to set the upper left coordinates of the first element E1 as (X1, Y1), the lower right coordinates thereof as (X2, Y2), the upper left coordinates of the second element E2 as (X3, Y3), the lower right coordinates thereof as (X4, Y4), the upper left coordinates of the third element E3 as (X5, Y5) and the lower right coordinates thereof as (X6, Y6). The upper left and lower right coordinates of each of the elements E1 to E3 is included in each drawing data.

First, when the recording to the figure photo information is finished only for the drawing data corresponding to the first element E1, (X1, Y1) and (X2, Y2) are stored as the upper left and lower right coordinates of the area of figure, respectively.

When the recoding to the figure photo information is finished for the drawing data corresponding to the second element E2 in addition to the first element E1, the upper left coordinates (minimum value in X-axis, minimum value in Y-axis) and the lower right coordinates (maximum value in X-axis, maximum value in Y-axis) of the rectangular area obtained by combining the first element E1 and the second element E2 are stored as the coordinates indicating the area of figure. That is, (X3, Y1) and (X2, Y4) are stored in the upper left and lower right coordinates, respectively.

When recording to the figure photo information is finished for drawing data corresponding to the third element E3 in addition to the first element E1 and the second element E2, the upper left and lower right coordinates of the rectangular area obtained by combining the first element E1, the second element E2 and the third element E3 are stored as the coordinates indicating the area of figure. That is, (X5, Y1) and (X2, Y4) are stored in the upper left and lower right coordinates, respectively.

Thus, for a figure formed of a plurality of elements, the area information (upper left and lower right coordinates) included in the figure photo information corresponding to the figure is updated in order.

After steps S6, S9 and S10 or if the type of obtained drawing data is not figure in step S7 (step S7; NO), the CPU 11 determines whether the processing for one page is finished (step S11). If the processing for the one page is not finished (step S11; NO), the processing returns to step S2, and the processing of steps S2 to S11 is repeated for another drawing data of the processing target page.

In step S11, if the processing for the one page is finished (step S11; YES), the CPU 11 stores the page image file, the page management file and the photo image files for the number of photographs included in the processing target page in the storage unit 17 as data of the processing target page so as to be associated with each other (step S12).

Next, the CPU 11 determines whether the document data D1 has a next page (step S13). If the document data D1 has the next page (step S13; YES), the processing returns to step S1, and the processing of steps S1 to S13 are repeated as the processing target of the next page.

In step S13, if the document data D1 has no next page (step S13; NO), that is, if the processing is finished for all the pages, the CPU 11 creates presentation data D2 in which a set of page image file, page management file and photo image files are associated with each other for each page, and stores the created presentation data D2 in the storage unit 17. Thus, the presentation data creating processing ends.

After the presentation data creating processing, the PC 10 and the tablet terminal 20 are connected to each other via a USB cable and the presentation data D2 is transmitted from the PC 10 to the tablet terminal 20. In the tablet terminal 20, the presentation data D2 received from the PC 10 is stored in the storage unit 27.

Figure 9:
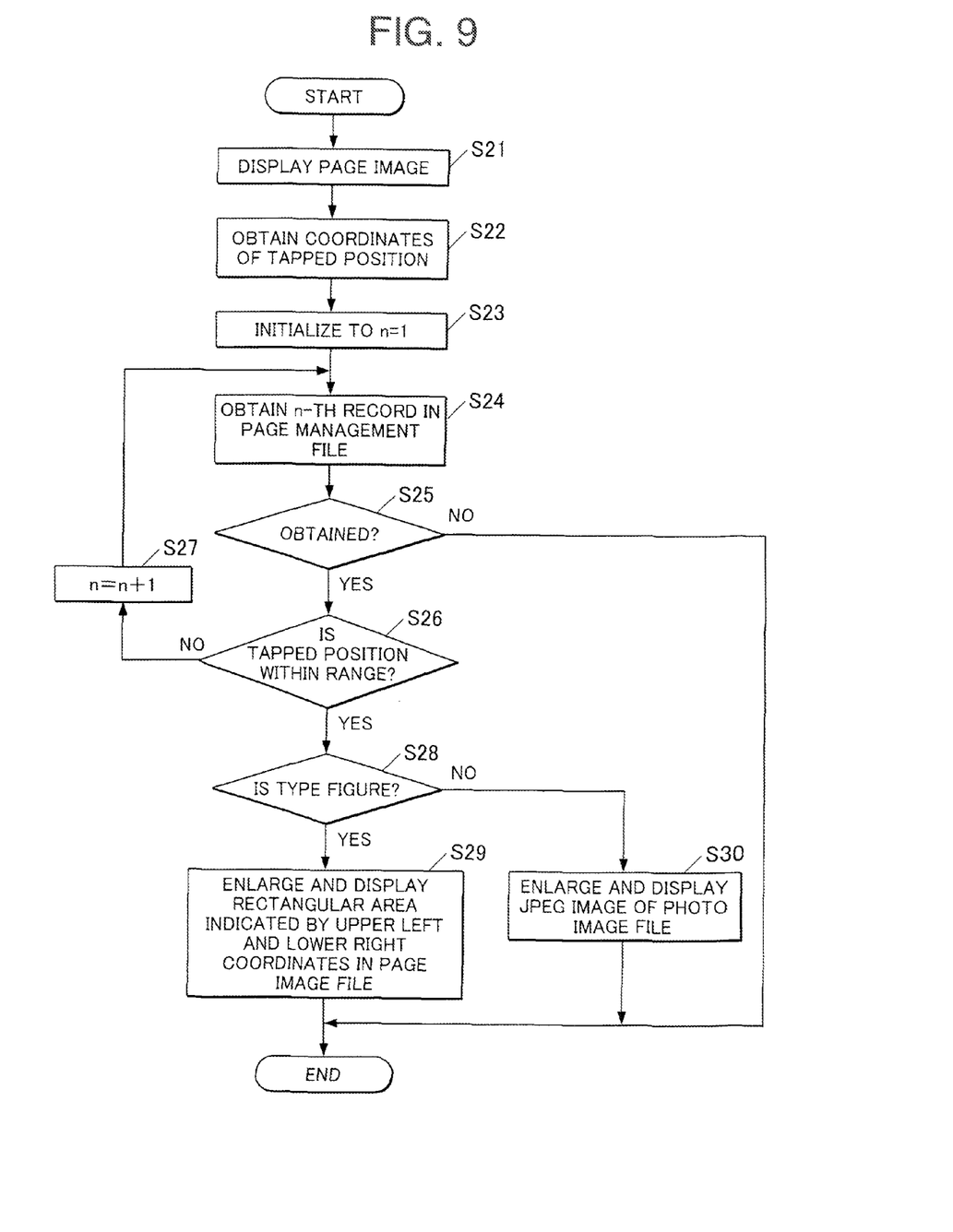
FIG. 9 is a flowchart showing presentation data display processing executed by the tablet terminal.

FIG. 9 is a flowchart showing presentation data display processing executed in the tablet terminal 20.

The processing is executed by software processing in cooperation between the CPU 21 and the presentation data display processing program 261 stored in the ROM 26.

The CPU 21 first reads out a page image file of a display target page included in the presentation data D2 stored in the storage unit 27 and displays the page image on the display unit 23 on the basis of the page image file (step S21).

Next, when any position on the page image displayed on the display unit 23 is tapped by user's operation via the touch panel 22B, the CPU 21 obtains the coordinates of the tapped position on the basis of the operation signal output from the touch panel 22B (step S22). The CPU 21 stores the obtained coordinates in the RAM 25.

Next, the CPU 21 initializes the record number n to 1 (step S23).

The CPU 21 obtains the n-th record in the figure photo information included in the page management file of the processing target page of the presentation data D2 (step S24).

Here, the CPU 21 determines whether the n-th record was obtained from the page management file of the processing target page (step S25). If the n-th record was obtained from the page management file of the processing target page (step S25; YES), the CPU 21 determines whether the tapped position is within the range of rectangular area indicated by the "upper left coordinates" and "lower right coordinates" included in the n-th record (step S26).

If the tapped position is not within the range of rectangular area indicated by the "upper left coordinates" and "lower right coordinates" included in the n-th record (step S26; NO), the CPU 21 increments the record number n by 1 (step S27), and returns to step S24.

In step S26, if the tapped position is within the range of rectangular area indicated by the "upper left coordinates" and "lower right coordinates" included in the n-th record (step S26; YES), the CPU 21 identifies the figure or photograph corresponding to the area and determines whether the type of the n-th record (figure photo information) corresponding to the area including the tapped position is figure (step S28).

If the type of n-th record corresponding to the area including the tapped position is figure (step S28; YES), the CPU 21 once reads out the rectangular area indicated by the "upper left coordinates" and "lower right coordinates" included in the n-th record of the page image file of the processing target page into the RAM 25, enlarges the read area and displays the image of enlarged figure so as to be superposed on the page image on the display unit 23 (step S29).

In step S28, if the type of n-th record corresponding to the area including the tapped position is photograph (step S28; NO), the CPU 21 enlarges JPEG image of photo image file indicated by "file name" included in the n-th record and displays the image of enlarged photograph so as to be superposed on the page image on the display unit 23 (step S30).

After steps S29 and S30, or if the n-th record was not obtained from the page management file of the processing target page in step S25 (step S25; NO), that is, if the figure or photograph to be enlargement target does not exist at the tapped position, the presentation data display processing ends.

Figure 10:
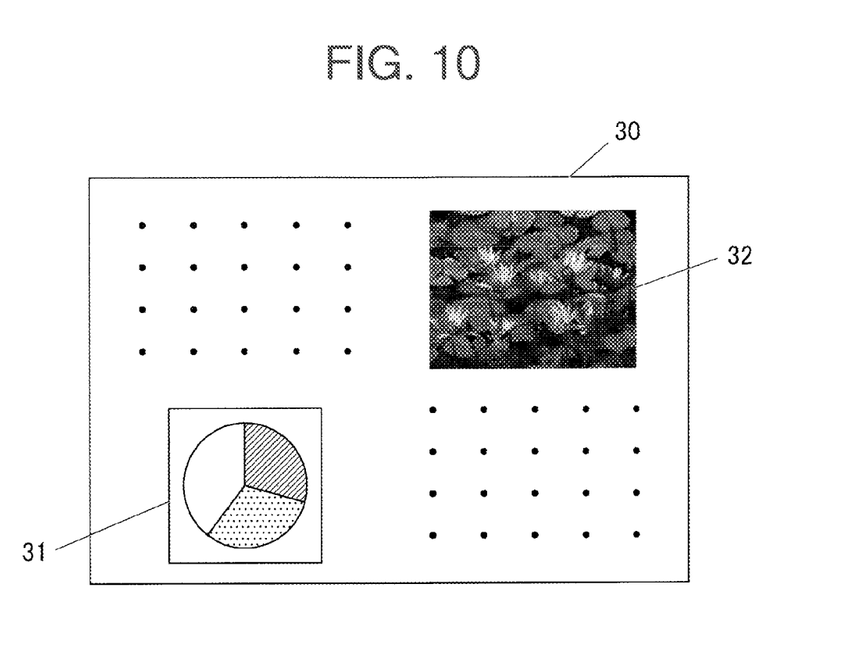
FIG. 10 is a display example of a page image displayed on the tablet terminal.

FIG. 10 shows an example of a page image 30 displayed on the display unit 23 in the tablet terminal 20. The page image 30 includes a FIG. 31 and a photograph 32.

Figure 11:
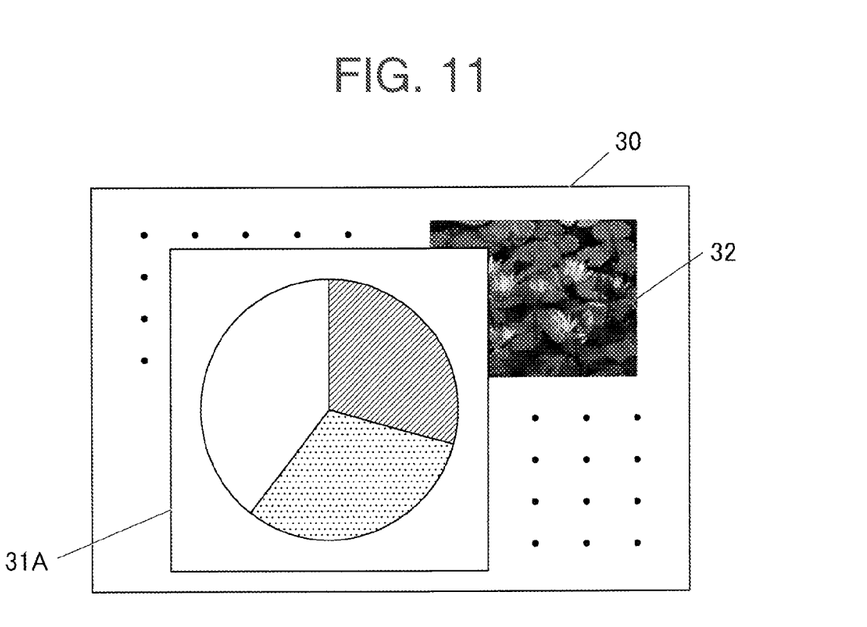
FIG. 11 is a display example of a state in which the figure is enlarged.

In the state shown in FIG. 10, when a position within the area of FIG. 31 is tapped by the operation via the touch panel 22B, as shown in FIG. 11, the enlarged FIG. 31A is displayed so as to overlap the page image 30. Here, the FIG. 31A is enlarged based on the lower left point of the original FIG. 31 as a reference. When enlarging the FIG. 31A, as shown in FIG. 11, control is performed so as not to cover the entire photograph 32 and not to exceed the range of page image 30.

Figure 12:
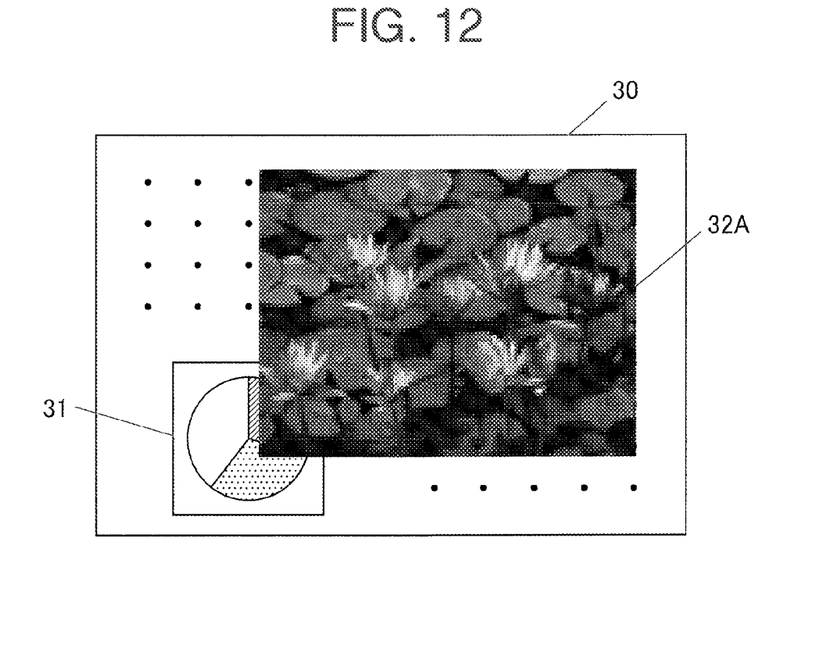
FIG. 12 is a display example of a state in which the photograph is enlarged.

In the state shown in FIG. 10, when a position within the area of photograph 32 is tapped by the operation via the touch panel 22B, as shown in FIG. 12, the enlarged photograph 32A is displayed so as to overlap the page image 30.

Here, the photograph 32A is enlarged based on the upper right point of the original photograph 32 as a reference. When enlarging the photograph 32A, as shown in FIG. 12, control is performed so as not to cover the entire FIG. 31 and not to exceed the range of page image 30.

As described above, according to the tablet terminal 20 in the embodiment, separately from the page image data, the figure photo information including area information of figure or photograph included in each page is stored, and thus, the figure or photograph corresponding to the position specified on the page image can be identified and enlarged easily. The user can obtain the display state in which the figure or photograph is enlarged by merely tapping the figure or photograph to be the enlargement target on the touch panel 22B.

Accordingly, operability when enlarging a figure or photograph included in an image can be improved.

Furthermore, since photo image data is stored for a photograph included in each page, the photograph can be enlarged to be displayed on the basis of the photo image data. Accordingly, compared to a case where the photo area of the page image data is enlarged, the image deterioration can be prevented and the processing for displaying the photograph can be simplified.

According to the PC 10 in the embodiment, presentation data D2 to be used in the tablet terminal 20 can be created by associating, for each page, page image data and figure photo information including area information of a figure or photograph included in each page with each other. Accordingly, separately from the page image data, figure photo information corresponding to a figure or photograph included in each page can be used and operability when enlarging the figure or photograph included in an image can be improved.

For the photograph included in each page, photo image data is included in figure photo information, and thus, the photograph can be enlarged and displayed without using page image data.

The description in the embodiment is an example of a display device and a data processing device according to the present invention, and the present invention is not limited to this. The detailed configurations and detailed operations of the units forming the devices can also be appropriately changed within the scope of the present invention.

For example, a separate file is prepared for a photograph in order to prevent image deterioration due to the enlargement display of the photograph in the embodiment; however, when the image deterioration is also to be prevented for a figure, a separate file may be prepared for figure.

For a figure or photograph included in each page, when performing processing to generate individual figure photo information separately from the page image data, whether to perform the processing may be selected for each page. Also, figure photo information may be generated separately from the page image data only for an important figure or photograph, or for a figure or photograph which is intended to be enlarged and explained later.

The embodiment has been described for a case where a USB cable is used when transmitting the presentation data D2 from the PC 10 to the tablet terminal 20; however, the method for transmitting the presentation data D2 from the PC 10 to the tablet terminal 20 is not limited to this. For example, the presentation data D2 may be transmitted via Bluetooth (registered trademark) communication or infrared communication from the PC 10 to the tablet terminal 20, or transmitted via a communication network. In the PC 10, the presentation data D2 may be stored in the storage medium and obtained from the storage medium by the tablet terminal 20.

As the file format of page image data and photo image data, TIFF (Tagged Image File Format), GIF (Graphic Interchange Format), PNG (Portable Network Graphics) and such like may also be used as well as the JPEG.

The above description discloses an example where the ROM is used as computer readable medium which stores programs for executing processing; however, the present invention is not limited to the example. As other computer readable medium, a non-volatile memory such as flash memory and portable recording medium such as CD-ROM can also be applied. The carrier wave may also be applied as medium for providing program data via a communication line.

The entire disclosure of Japanese Patent Application No. 2013-262046 filed on Dec. 19, 2013 including description, claims, drawings, and abstract are incorporated herein by reference in its entirety.

What is claimed is:

1. A display device, comprising:
   a storage which stores, for each of a plurality of pages, page image data of a page including a figure or photograph and figure photo information, the page image data and the figure photo information being stored in association with each other, the figure photo information corresponding to the figure or photograph included in the page, and the figure photo information being information for individually displaying the figure or photograph and including area information which indicates an area occupied by the figure or photograph in the page image data corresponding to the page;
   a display which displays a page image based on the page image data stored in the storage; and
   a hardware processor which executes a program stored in a memory to perform functions comprising:
      receiving, in response to a user operation, specification of a position on the page image displayed on the display;
      determining whether the position specified on the page image by the user operation is within an area of a figure or photograph included in the page image based on the area information included in the figure photo information corresponding to the page image, and identifying the figure or photograph corresponding to the area in response to a determination that the position specified on the page image by the user operation is within the area of the figure or photograph included in the page image;
      enlarging the identified figure or photograph to be displayed on the display based on the figure photo information corresponding to the identified figure or photograph, the identified figure or photograph being identified based on the user operation, and the user operation being an operation of tapping the identified figure or photograph without manually controlling a display position of the enlarged identified figure or photograph; and
      performing control so that, when enlarging the identified figure or photograph to be displayed on the display, (i) the identified figure or photograph is enlarged with respect to one of corner coordinates thereof as a reference point, the reference point being a corner coordinate of the identified figure or photograph which does not move after the identified figure or photograph is enlarged, and the reference point being based on the position of the identified figure or photograph in the page image data, and (ii) the enlarged identified figure or photograph does not cover an entirety of another figure or photograph which is already displayed on the display.

2. The display device according to claim 1, wherein:
the storage further stores photo image data corresponding to a photograph included in a page, in association with the page image data corresponding to the page, for each of the plurality of pages, and
the processor enlarges an identified photograph to be displayed on the display based on the photo image data corresponding to the identified photograph.

3. The display device according to claim 1, wherein, when the processor enlarges the identified figure or photograph to be displayed on the display, the processor performs control so that the identified figure or photograph is not displayed outside of a range of the page image which is displayed on the display.

4. A presentation system comprising:
the display device according to claim 1; and
a data processing device which creates the page image data to be used in the display device,
wherein the data processing device comprises a hardware processor which executes a program stored in a memory to perform functions comprising:
converting each of pages of document data including a figure or photograph into the page image data;
generating, for each of the pages being converted, the figure photo information for individually displaying the figure or photograph included in the page, the figure photo information including the area information which indicates the area occupied by the figure or photograph in the page image data corresponding to the page; and
storing, for each of the pages being converted, the page image data and the figure photo information corresponding to the figure or photograph included in the page so as to be associated with each other.

5. The presentation system according to claim 4, wherein the data processing device further converts, for each of the pages being converted, a photograph included in the page into photo image data, and
wherein the figure photo information generated for each of the pages further includes the converted photo image data corresponding to the photograph included in the page.

6. The display device according to claim 1, wherein the processor enlarges the identified figure or photograph to be displayed on the display with respect to a lower left point or an upper right point of the identified figure or photograph before enlargement as the reference point.

7. The display device according to claim 1, wherein the processor executes the program stored in the memory to perform further functions comprising:
determining whether the position specified on the page image corresponds to a figure or a photograph, based on the area information included in the figure photo information corresponding to the page image;
in response to determining that the position specified on the page image corresponds to a figure, enlarging the figure; and
in response to determining that the position specified on the page image corresponds to a photograph, enlarging photo image data corresponding to the photograph.

8. A non-transitory computer readable storage medium having a program stored thereon for controlling a display device, the display device comprising a display, a storage, and a hardware processor, the storage storing, for each of a plurality of pages, page image data of a page including a figure or photograph and figure photo information, the page image data and the figure photo information being stored in association with each other, the figure photo information corresponding to the figure or photograph included in the page, and the figure photo information being information for individually displaying the figure or photograph and including area information which indicates an area occupied by the figure or photograph in the page image data corresponding to the page, and the program being executable by the processor to control the display device to perform functions comprising:
displaying, on the display, a page image based on the page image data stored in the storage;
obtaining, in response to a user operation, a position specified on the page image displayed on the display;
determining whether the position specified on the page image by the user operation is within an area of a figure or photograph included in the page image based on the area information included in the figure photo information corresponding to the page image, and identifying the figure or photograph corresponding to the area in response to a determination that the position specified on the page image by the user operation is within the area of the figure or photograph included in the page image;
enlarging the identified figure or photograph to be displayed on the display based on the figure photo information corresponding to the identified figure or photograph, the identified figure or photograph being identified based on the user operation, and the user operation being an operation of tapping the identified figure or photograph without manually controlling a display position of the enlarged identified figure or photograph; and
performing control so that, when enlarging the identified figure or photograph to be displayed on the display, (i) the identified figure or photograph is enlarged with respect to one of corner coordinates thereof as a reference point, the reference point being a corner coordinate of the identified figure or photograph which does not move after the identified figure or photograph is enlarged, and the reference point being based on the position of the identified figure or photograph in the page image data, and (ii) the enlarged identified figure or photograph does not cover an entirety of another figure or photograph which is already displayed on the display.

9. A display device, comprising:
a display; and
a hardware processor which executes a program stored in a memory to perform functions comprising:
displaying, on the display, a page image including at least one image element, the at least one image element being one of a figure and a photograph;
receiving input of a user operation specifying a position on the page image displayed on the display;
identifying an image element, from among the at least one image element of the page image displayed on the display, that corresponds to the position specified by the user operation; and
enlarging the identified image element so that the identified image element is enlarged with respect to one of corner coordinates thereof as a reference point, the reference point being a corner coordinate of the identified image element which does not move after the identified image element is enlarged, and the reference point being based on the position of the identified image element in the page image, wherein the identified image element is identified based on the user operation, the user operation being an operation of tapping the identified image element without manually controlling a display position of the enlarged identified image element.

10. The display device according to claim 9, further comprising:

a storage in which an enlarged version of the at least one image element is stored;

wherein the processor, when enlarging the identified image element, reads out the enlarged version of the identified image element from the storage and displays the enlarged version of the identified image element on the display.

11. A display device, comprising:

a storage which stores, for each of a plurality of pages, page image data of a page including a figure or photograph and figure photo information, the page image data and the figure photo information being stored in association with each other, the figure photo information corresponding to the figure or photograph included in the page, and the figure photo information being information for individually displaying the figure or photograph and including area information which indicates an area occupied by the figure or photograph in the page image data corresponding to the page;

a display which displays a page image based on the page image data stored in the storage; and a hardware processor which executes a program stored in a memory to perform functions comprising:

receiving, in response to a user operation, specification of a position on the page image displayed on the display;

determining whether the position specified on the page image by the user operation is within an area of a figure or photograph included in the page image based on the area information included in the figure photo information corresponding to the page image, and identifying the figure or photograph corresponding to the area in response to a determination that the position specified on the page image by the user operation is within the area of the figure or photograph included in the page image;

enlarging the identified figure or photograph to be displayed on the display based on the figure photo information corresponding to the identified figure or photograph, the identified figure or photograph being identified based on the user operation, and the user operation being an operation of tapping the identified figure or photograph without manually controlling a display position of the enlarged identified figure or photograph; and performing control so that, when enlarging the identified figure or photograph to be displayed on the display, (i) the identified figure or photograph is enlarged with respect to one of a lower left point or an upper right point of the identified figure or photograph before enlargement as a reference point, the reference point being based on the position of the identified figure or photograph in the page image data, (ii) when the reference point is the lower left point of the identified figure or photograph before enlargement, a lower left point of the identified figure or photograph after enlargement coincides with the lower left point of the identified figure or photograph before enlargement, (iii) when the reference point is the upper right point of the identified figure or photograph before enlargement, an upper right point of the identified figure or photograph after enlargement coincides with the upper right point of the identified figure or photograph before enlargement, and (iv) the enlarged identified figure or photograph does not cover an entirety of another figure or photograph which is already displayed on the display.

* * * * *